United States Patent
Nakamura et al.

(10) Patent No.: US 6,169,346 B1
(45) Date of Patent: Jan. 2, 2001

(54) MOTOR EQUIPPED DRIVING APPARATUS

(75) Inventors: Yusuke Nakamura, Hamamatsu; Takahiro Iida, Toyohashi, both of (JP)

(73) Assignee: ASMO Co., Ltd., Shizuoka-Pref. (JP)

( * ) Notice: Under 35 U.S.C. 154(b), the term of this patent shall be extended for 0 days.

(21) Appl. No.: 09/325,259

(22) Filed: Jun. 3, 1999

(30) Foreign Application Priority Data

Jun. 3, 1998 (JP) .................................................. 10-154812

(51) Int. Cl.$^7$ .............................. B60J 1/00; E05F 15/16; H02K 51/00
(52) U.S. Cl. ........................ 310/75 D; 310/75 R; 74/411; 464/92
(58) Field of Search ................................. 310/75 D, 79, 310/75 R, 96, 97, 98, 99; 74/82, 411, 89.14; 464/73, 92

(56) References Cited

U.S. PATENT DOCUMENTS

| | | | |
|---|---|---|---|
| 4,708,514 | * 11/1987 | Walter et al. | 403/372 |
| 4,728,832 | * 3/1988 | Jatnieks et al. | 310/41 |
| 4,748,865 | * 6/1988 | Umezawa et al. | 74/411 |
| 4,899,608 | * 2/1990 | Knappe et al. | 74/411 |
| 5,178,026 | * 1/1993 | Matsumoto | 74/411 |
| 5,382,194 | * 1/1995 | Scherner et al. | 464/92 |
| 5,452,622 | * 9/1995 | Fenelon | 74/411 |
| 5,564,981 | * 10/1996 | Iwabuchi et al. | 464/73 |
| 5,787,755 | * 8/1998 | Periou et al. | 74/411 |

FOREIGN PATENT DOCUMENTS

| | | | |
|---|---|---|---|
| 9-184359 | 7/1997 | (JP) | E05F/15/16 |
| 9-235944 | 9/1997 | (JP) | E05F/15/16 |

* cited by examiner

Primary Examiner—Burton Mullins
(74) Attorney, Agent, or Firm—Fish & Richardson P.C.

(57) ABSTRACT

A driving apparatus includes a motor, an output unit, and an elastic transmission mechanism. The transmission mechanism is disposed between the motor and the output unit to relieve shocks applied to the driving apparatus when operation of the output unit is obstructed. The elastic transmission mechanism includes a first elastic member which absorbs a first shock and second elastic member which absorbs a second shock different in torque from the first shock.

12 Claims, 5 Drawing Sheets

MOTOR EQUIPPED DRIVING APPARATUS

CROSS REFERENCE TO RELATED APPLICATION

The present application is based on and claims priority from Japanese Patent Application Hei 10-154812 filed on Jun. 3, 1998, the contents of which are incorporated herein by reference.

BACKGROUND OF THE INVENTION

1. Field of the Invention

The present invention relates to a driving apparatus including a motor and, more particularly, a door driving apparatus having a pinch-free function.

2. Description of the Related Art

In a power window device, a window regulator converts rotation of a motor into a reciprocal motion to raise or lower a window glass pane. Such a power window device may have a pinch-relief switch that stops the rising motion of the glass pane and switches the rising motion to descending motion if motor current exceeds a predetermined value or the rising speed of the glass pane becomes less than a predetermined value. Therefore, it takes a considerable time for the glass pane to stop or descend after the pinch is detected.

Power window devices disclosed in JP-A-9-184359 and JP-A-9-235944 have a C-shaped spring between a motor and an output shaft. If the glass pane pinches some foreign particle between its edge and a portion of a window frame, the spring is deformed to limit the pinching force. The spring is also intended to relieve shocks applied to the motor when an edge of the glass pane collides against a portion of a window frame. However, if the spring constant of the spring is made as small as 20–40 N/mm to lessen the pinching force to a suitable level, it is too small to sufficiently reduce the collision shock, as compared with a suitable spring constant that is as much as 100 N/mm.

SUMMARY OF THE INVENTION

A main object of the invention is to provide an improved driving apparatus having sufficient pinch-relief function and collision shock absorbing function.

According to a main aspect of the invention, a driving apparatus includes a motor, an output shaft, and an elastic transmission mechanism disposed between the motor and the output shaft. The elastic transmission mechanism relieves shocks when rotation of the output shaft is obstructed. The elastic transmission mechanism includes two elastic members which absorb shocks different in torque from each other.

Another object of the invention is to provide a driving apparatus having a weather-resistant elastic transmission mechanism.

According to another aspect of the invention, a driving apparatus includes a motor, an output unit, a worm gear unit having a worm connected to the motor and a worm wheel having an inner periphery, an elastic transmission mechanism disposed in the inner periphery of the worm wheel. The elastic transmission mechanism includes a first elastic member connected to the worm wheel, a transmission plate connected to the first elastic member, a second elastic member engaged with the transmission plate to bend in one direction, and an output plate engaged with both the second elastic member and the transmission plate and connected to said output unit. The output plate is driven directly by the second elastic member in one direction and directly by the transmission plate in the other direction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A driving apparatus according to a first embodiment of the invention is described with reference to FIGS. 1–6.

Figure 1:
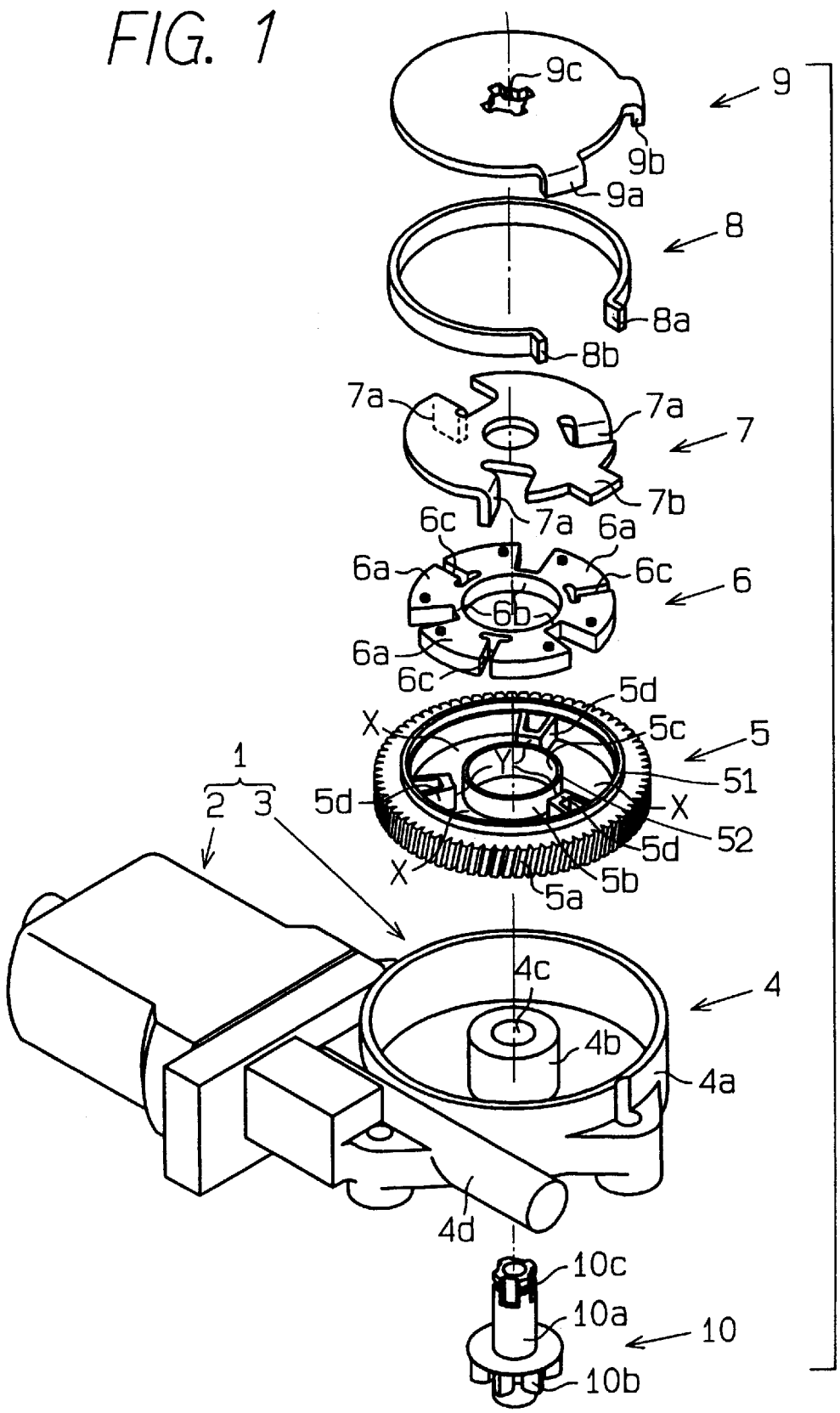
FIG. 1 is an exploded view illustrating a main portion of a driving apparatus according to a first embodiment of the invention.

In FIG. 1, a driving apparatus 1 for a power window device includes motor 2 and output unit 3. Output unit 3 has housing 4, worm wheel 5, rubber disk member 6, transmission plate 7, C-shaped spring 8, output plate 9 and output shaft 10.

Housing 4 is composed of cylindrical wheel housing 4a and worm housing 4d. Wheel housing 4a has a bottom and a cylindrical bearing 4b at the center of the bottom thereof. Bearing 4b has through hole 4c.

Wheel housing 4a accommodates therein an elastic transmission mechanism including worm wheel 5, rubber disk member 6, transmission plate 7, C-shaped spring 8, and output plate 9. Worm housing 4d accommodates therein a worm (not shown) carried by a motor shaft of motor 2.

Worm wheel 5 is made of resin and is composed of a bottom, a cylindrical outer member 51 on which gear teeth 5a are formed to mesh with the worm carried by the motor shaft, a cylindrical inner member 52 having cylindrical support surface 5b and center through hole 5c, and three support walls 5d formed between the inner periphery of outer member 51 and support surface 5b at equal intervals (i.e. 120° in angle). Three support walls form three compartments X and connection annular groove Y.

Rubber disk member 6 includes three fan-shaped elastic portions 6a and connection ring portion 6b. Each fan-shaped elastic portion 6a has a radially extending center groove 6c. Preferably, each elastic portion 6a has spring constant of about 100 N/mm.

Transmission plate 7 is a metal disk that has three projections 7a at one side thereof, which are cut therefrom and bent to extend in the axial direction thereof and to respectively engage center groove 6c, and radially extending projection 7b formed at a peripheral portion thereof.

C-shaped spring 8 has a pair of radially extending projections 8a and 8b and has spring constant between 20–40 N/mm.

Output plate 9 is a metal disk member that has a diameter larger than transmission plate 7. Output plate 9 has a pair of projections 9a and 9b extending axially downward from peripheral portions thereof spaced apart at a prescribed angle and center cross hole 9c.

Output shaft 10 has shaft portion 10a and gear portion 10b. Shaft portion 10a has cross male member 10c that is engaged with cross hole 9c.

Wheel housing 4a accommodates worm wheel 5 therein so that gear teeth 5a can mesh with the worm carried by the motor shaft and so that center through hole 5c can slidably fit to bearing 4b. Thus, worm wheel 5 rotates as motor 2 rotates.

Rubber disk member 6 is disposed inside worm wheel 5 so that three elastic portions 6a and ring portion 6b are respectively fitted into three compartments X and annular groove Y.

Figure 2:
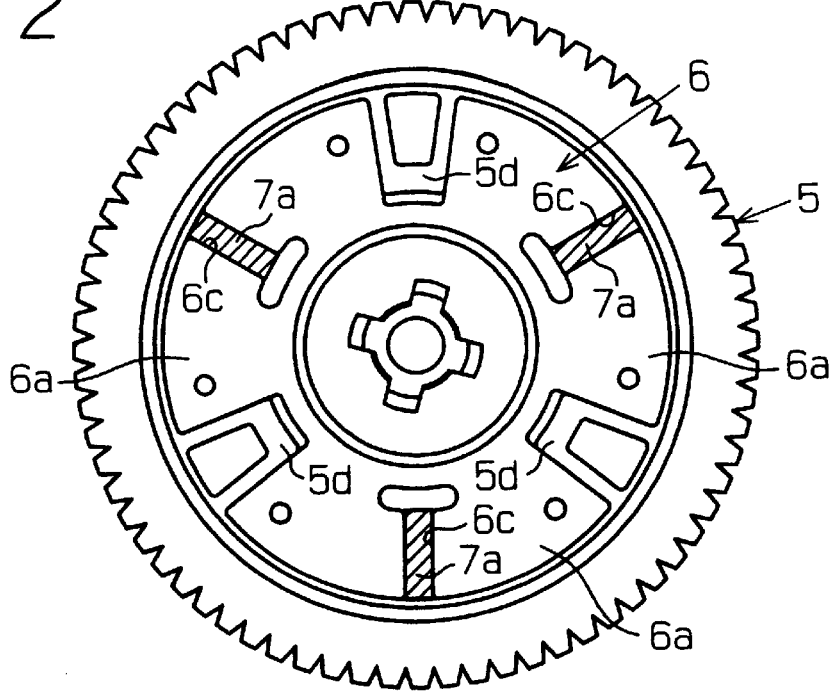
FIG. 2 is a cross-sectional plan view of a main portion of the driving apparatus.

Transmission plate 7 is connected to rubber disk member 6 with three projections 7a being respectively inserted into tree center grooves 6c, as shown in FIG. 2. Thus, rubber disk member 6 rotates when worm wheel 5 rotates and drives elastic portions 6a by support walls 5d.

Figure 3:
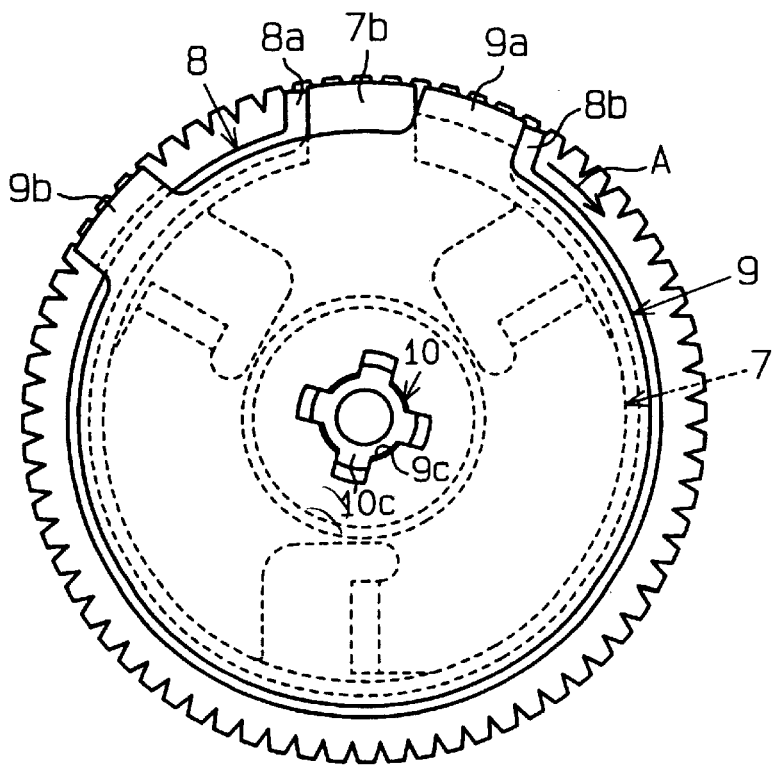
FIG. 3 is a plan view of a main portion shown in FIG. 2.

C-shaped spring 8 and output plate 9 are respectively connected to transmission plate 7, as shown in FIG. 3. C-shaped spring 8 is disposed on the outer periphery of outer member 51 along the upper end of gear teeth 5a so that radially extending projection 8a thereof engages with the left side of radially extending projection 7b of transmission plate 7. Accordingly the other projection 8b of C-shaped spring is set free to be apart from projection 8a as indicated by an arrow A. Output plate 9 is put on the upper surface of transmission plate 7 so that projection 9a thereof can be disposed between projections 7b and 8b. Thus, projection 9a engages with projection 8b, and transmission plate 7, C-shaped ring 8, and output plate 9 are connected with one another. Axially extending projection 9b is disposed radially outer side of C-shaped spring 8.

Elastic disk member 6, transmission plate 7, C-shaped spring 8 and output plate 9 are housed in wheel housing 4a. The upper open end of wheel housing 4a is normally covered by a cover member (not shown). As a result, a compact and weather-resistant transmission mechanism can be provided.

If transmission plate 7 rotates left in FIG. 3, projection 7b thereof pushes projection 8a of C-shaped spring 8, and projection 8b pushes projection 9a of output plate 9. Thus, output plate 9 rotates left together with C-shaped spring 8.

On the other hand, if transmission plate 7 rotates in the opposite direction or right, projection 7b thereof pushes projection 9a to rotate output plate 9 right.

Shaft portion 10a of output shaft 10 is inserted into bearing through hole 4c from the bottom side of wheel housing 4a so that cross male member 10c thereof meshes with cross hole 9c of output plate 9. Thus, output shaft 10 is rotatably supported by wheel housing 4a to rotate output plate 9.

Figure 5:
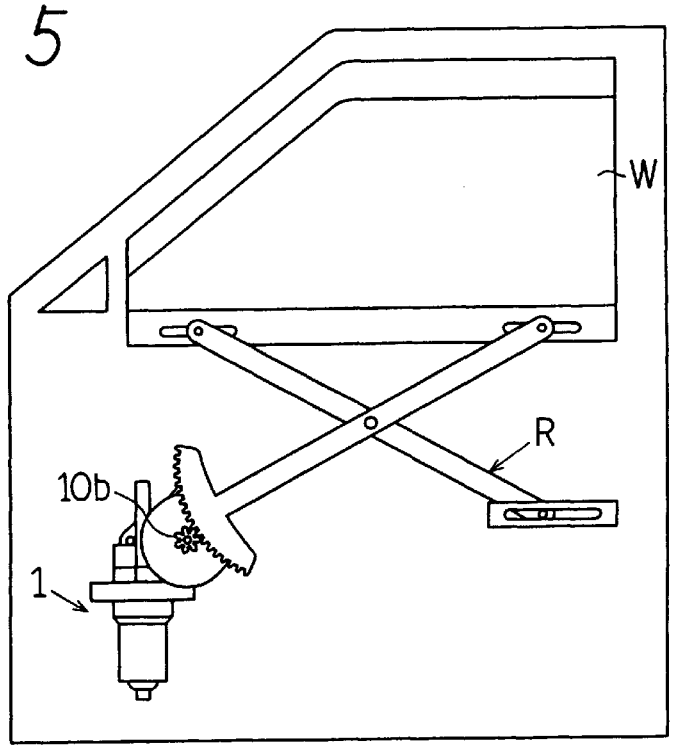
FIG. 5 is a schematic view of a vehicle door equipped with the driving apparatus.

As shown in FIG. 5, driving apparatus 1 is mounted in a vehicle door so that gear portion 10b of output shaft 10 can engage with teeth of a well-known regulator member R. When gear portion 10b rotates in one direction (e.g. left), window glass pane W rises up and closes. On the other hand, glass pane W descends to open when gear portion 10b rotates in the opposite direction (e.g. right). A rotation sensor (not shown) is disposed in driving apparatus 1 to detect the rotation of output plate 9. A pinch-relief switch (not shown) is also disposed in driving apparatus 1 to stop and reverse the motor rotation to lower the glass pane, when the rotation speed of output plate 9 changes abruptly.

When motor 2 is operated to close window pane W, worm wheel 5 is rotated left (in the window-closing direction). Accordingly, rubber disk member 6 and transmission plate 7 rotate in the same direction, and C-shaped spring 8, output plate 9 and output shaft 10 rotate in the same direction to drive window regulator R. This provides reciprocating motion to raise or close glass pane W.

When the upper edge of glass pane W collides with a portion of a window frame, C-shaped spring bends first to relieve a first shock applied to driving apparatus 1, such as a shock applied to the worm, worm wheel 5 and to motor 2, and elastic portions 6a sufficiently absorbs a second shock applied to the same.

Figure 4:
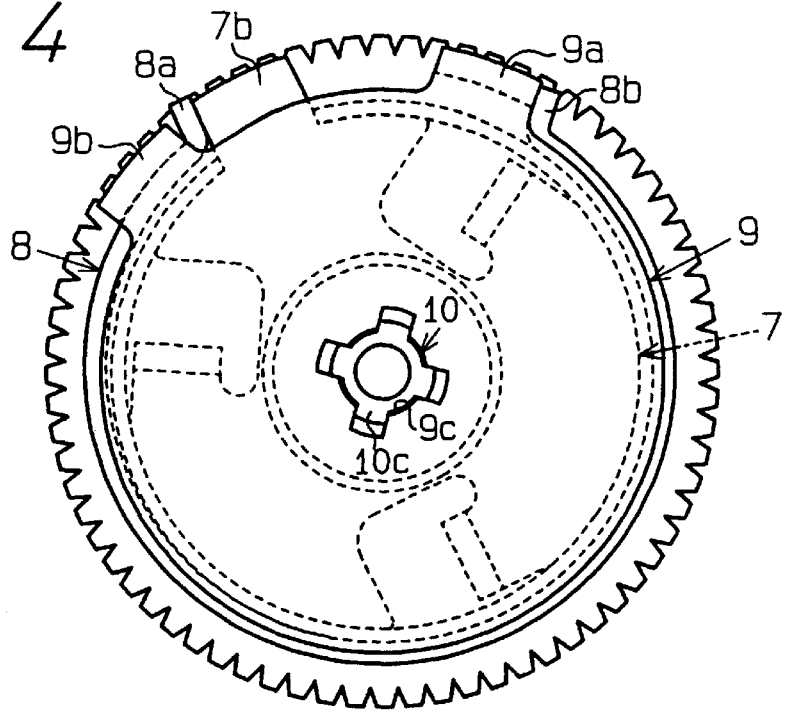
FIG. 4 is a plan view of the main portion shown in FIG. 3.

If glass pane W pinches a foreign body, C-shaped spring 8 bends so that projection 8b of C-shaped spring 8 stays still while projection 8a is pushed left by projection of transmission plate 7b, as shown in FIG. 4. Thus, output plate 9 and output shaft 10 stops and apply much less torque to the foreign body than transmission plate 7. As soon as glass pane W pinches the foreign body, this is detected by the rotation sensor, so that the pinch-relief switch stops motor 2 and reverses the same.

It is noted that the spring constants of the elastic disk 6 and C-shaped spring 8 can be set independently from each other to provide optimum values both for absorbing the collision shock between the glass pane and the window frame and for reliving the pinching torque applied to the foreign body.

When motor 2 is operated to open window pane W, worm wheel 5 is rotated right (in the window-opening direction). Accordingly, rubber disk member 6, transmission plate 7, output plate 9 and output shaft 10 rotate in the direction same as worm wheel 5. Thus, window regulator R is driven to provide reciprocating motion to lower or open glass pane W.

Figure 6:
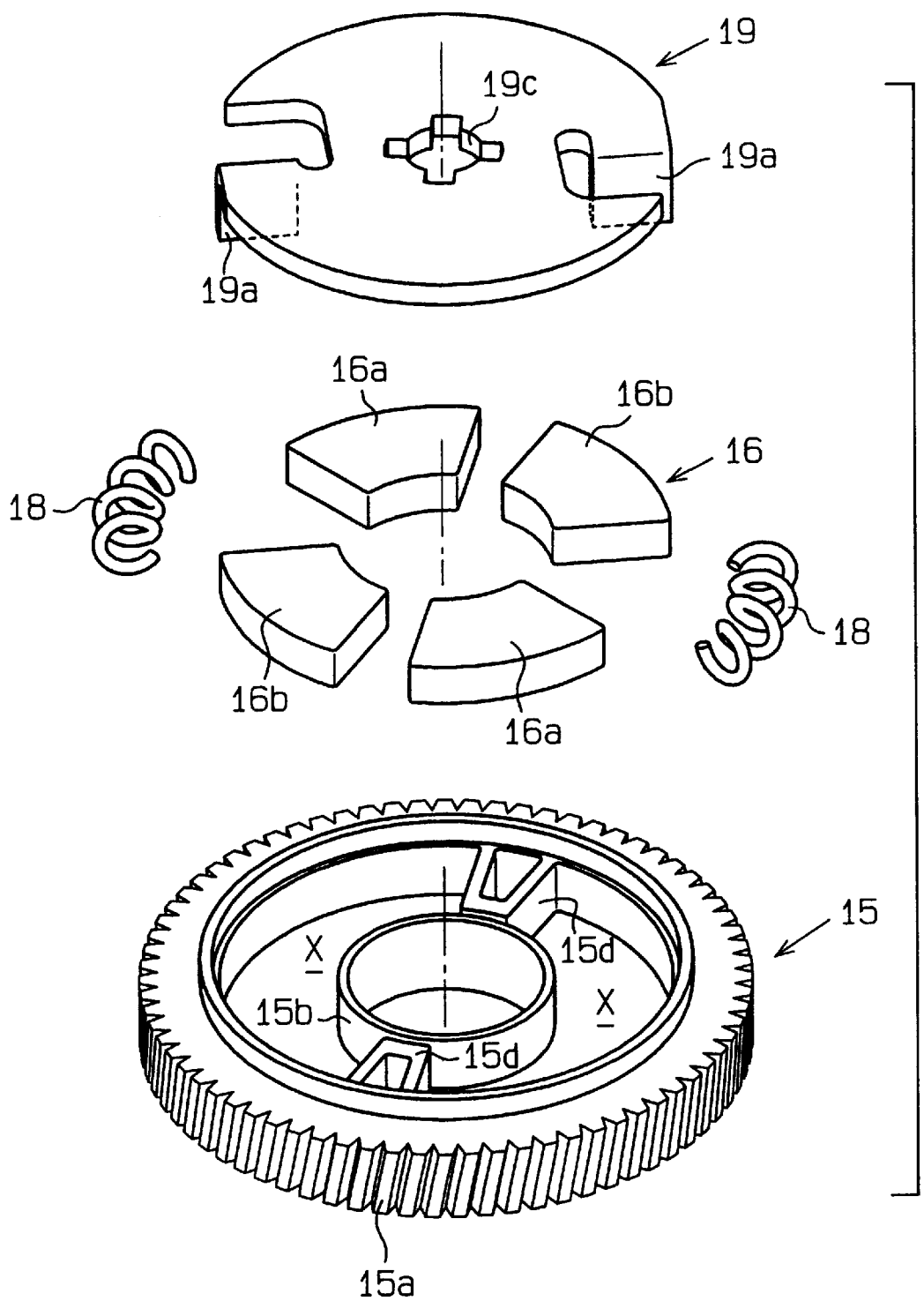
FIG. 6 is an exploded view of a main portion of a driving apparatus according to a second embodiment of the invention.
Figure 7:
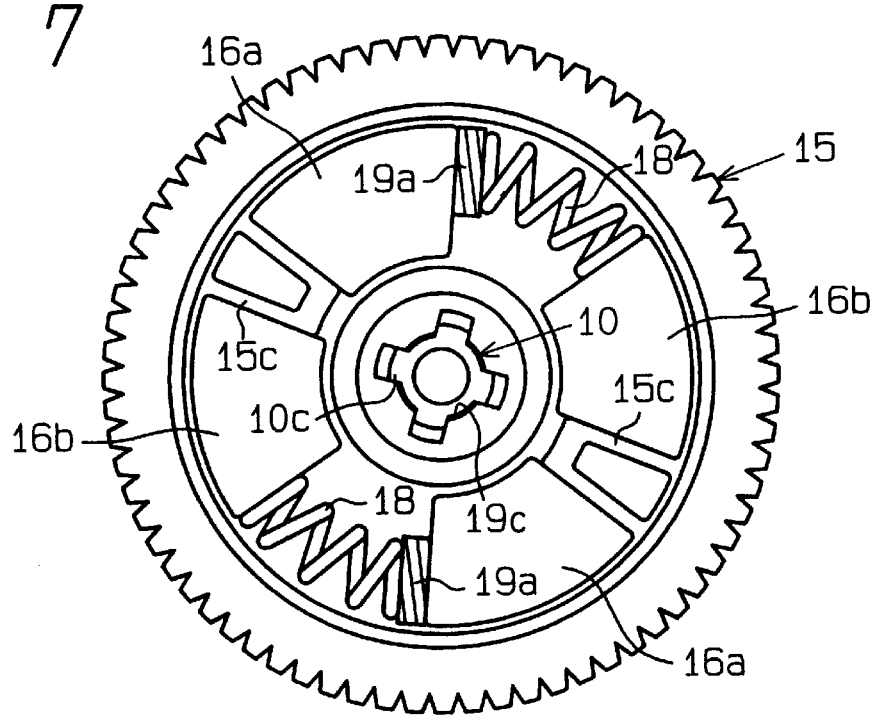
FIG. 7 is a plan view of a main portion shown in FIG. 6.

A driving apparatus according to a second embodiment of the invention is described with reference to FIGS. 6–8.

Worm wheel 15 has teeth 15a, support surface 15b, and a pair of support walls 15d, and is substantially the same as warm wheel 5 of the driving apparatus according to the first embodiment. The pair of support walls forms two compartments X inside worm wheel 15.

Rubber disk member 16 has two pairs of fan-shaped elastic portions 16a and 16b and a pair of coil springs 18. Each pair of elastic portions 16a and 16b is fitted to one of compartments X with one of coil springs 18 therebetween via projection 19a of output plate 19 as shown in FIG. 7. Thus rubber disk member 16 and coil springs 18 are disposed on the same plane between worm wheel 15 and output plate 19.

Rubber disk member 16 has spring constant of about 100 N/mm, and each of coil springs 18 has spring constant of 20–40 N/mm.

No transmission plate is necessary in this second embodiment.

Output plate 19 has two axially extending projections 19a and center cross hole 19c. Other portions are substantially the same as the corresponding portions of the driving apparatus according to the first embodiment.

When motor is driven to close and open window glass pane W, worm wheel 15, rubber disk member 16, and output plate 19 operate in substantially the same manner as the driving apparatus according to the first embodiment.

Figure 8:
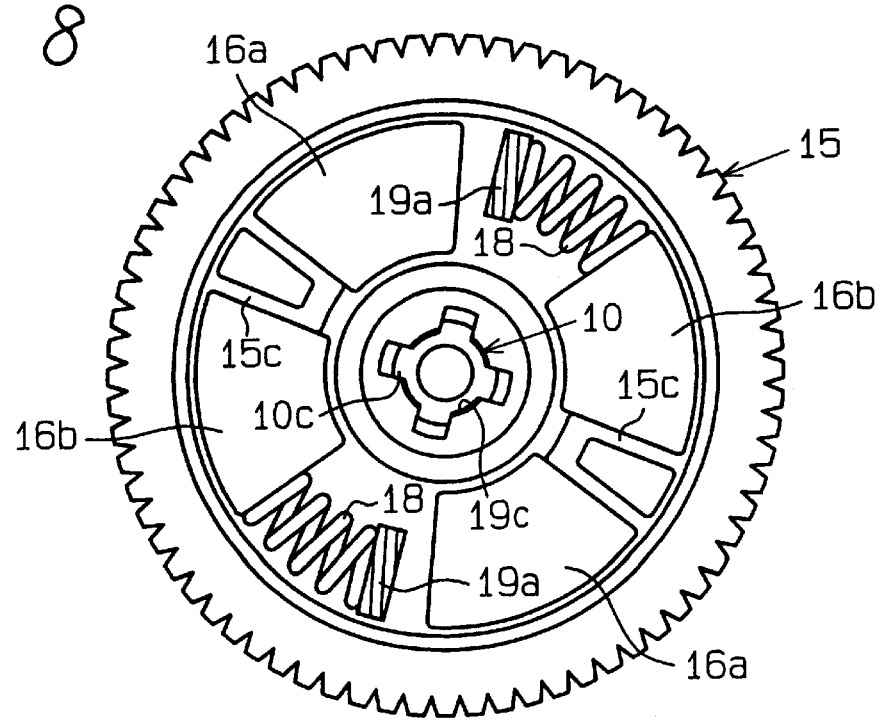
FIG. 8 is a plan view of the main portion shown in FIG. 7.

If glass pane W pinches a foreign body between the same and a portion of a window frame, coil springs 18 bend as shown in FIG. 8 until motor 2 is switched to be reversed as described above.

The driving apparatus according to the preferred embodiments of the present invention can be applied to various members such as a shutter driving apparatus for various fields of use.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A driving apparatus comprising:

a motor having a motor shaft;

an output unit having an output shaft; and an elastic transmission mechanism, disposed between said motor shaft and said output shaft, for relieving shocks applied to said driving apparatus when rotation of said output shaft is obstructed, wherein said elastic transmission mechanism comprises a first elastic member which absorbs a first shock and second elastic member which absorbs a second shock different in torque from said first shock, wherein said transmission mechanism comprises a transmission plate disposed between said first and second elastic members, and said transmission plate transmits motor-shaft torque from said motor shaft to said output shaft through said first and second elastic members in one direction and only through said first elastic member in the other direction.

2. The driving apparatus as claimed in claim 1, further comprising a worm gear unit disposed between said motor shaft and said output unit, wherein said worm gear unit comprises a worm connected to said motor shaft and a worm wheel connected to said elastic transmission mechanism.

3. The driving apparatus as claimed in claim 1, wherein said worm wheel has an inner periphery in which said elastic member is disposed.

4. The driving apparatus as claimed in claim 2, wherein said second elastic member is disposed on said first elastic member in the axial direction of said output shaft.

5. A driving apparatus comprising:

a motor having a motor shaft;

an output unit having an output shaft; and an elastic transmission mechanism, disposed between said motor shaft and said output shaft, for relieving shocks applied to said driving apparatus when rotation of said output shaft is obstructed, wherein said elastic transmission mechanism comprises a first elastic member which absorbs a first shock and second elastic member which absorbs a second shock different in torque from said first shock, wherein said first and second elastic members are disposed on the same plane.

6. A driving apparatus comprising:

a motor having a motor shaft;

an output unit having an output shaft;

a worm gear unit having a worm connected to said motor shaft and a worm wheel having an inner periphery;

an elastic transmission mechanism, disposed in said inner periphery of said worm wheel; wherein said elastic transmission mechanism comprises a first elastic member connected to said worm wheel, a transmission plate connected to said first elastic member, a second elastic member engaged with said transmission plate to bend in one direction, and an output plate engaged with both said second elastic member and said transmission plate and connected to said output shaft, and said output plate is driven directly by said second elastic member in said one direction and directly by said transmission plate in the other direction.

7. The driving apparatus as claimed in claim 6, wherein said second elastic member has a smaller spring constant than said first elastic member.

8. The driving apparatus as claimed in claim 6 further comprising means, connected to said output shaft, for driving a door.

9. The driving apparatus as claimed in claim 6, wherein said second elastic member is disposed on said first elastic member in the axial direction of said output shaft.

10. The driving apparatus as claimed in claim 6, wherein said first and second elastic members are disposed on the same plane between said worm wheel and said output plate.

11. A driving apparatus comprising:

a motor having a motor shaft;

an output unit having an output shaft;

an elastic transmission mechanism, disposed between said motor shaft and said output shaft, for transmitting torque of said motor shaft to said output shaft; wherein said elastic transmission mechanism comprises a first elastic member connected to said motor shaft and a second elastic member disposed on said first elastic member in the axial direction of said output shaft and connected to said output shaft, wherein said transmission mechanism comprises a transmission plate disposed between said first and second elastic members, and said transmission plate transmits motor-shaft torque from said motor shaft to said output shaft through said first and second elastic members in one direction and only through said first elastic member in the other direction.

12. A driving apparatus for a vehicle window comprising:

a motor having a motor shaft;

an output unit having an output shaft linked to a vehicle window glass pane; and an elastic transmission mechanism, disposed between said motor shaft and said output shaft, for relieving shocks applied to said driving apparatus when rotation of said output shaft is obstructed, said elastic transmission mechanism comprising a first elastic member and a second elastic member; wherein torque is transmitted from said motor shaft to said output shaft through said first and second elastic members when said window glass pane is closed and only through said first elastic member when said window glass pane is opened.

* * * * *